United States Patent
Raux et al.

(10) Patent No.: US 10,649,635 B2
(45) Date of Patent: May 12, 2020

(54) MULTI-MODAL FUSION ENGINE (71) Applicant: Lenovo (Singapore) Pte. Ltd., Singapore (SG)

(72) Inventors: Antoine Roland Raux, Cupertino, CA (US); Akshay Chandrashekaran, Mountain View, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 293 days.

(21) Appl. No.: 14/498,241

(22) Filed: Sep. 26, 2014

(65) Prior Publication Data
US 2016/0092074 A1    Mar. 31, 2016

(51) Int. Cl.
| | |
|---|---|
| *G06F 3/0484* | (2013.01) |
| *G06F 3/048* | (2013.01) |
| *G06F 3/038* | (2013.01) |
| *G06F 3/01* | (2006.01) |
| *G06F 3/0488* | (2013.01) |
| *G06F 17/24* | (2006.01) |
| *G06F 3/16* | (2006.01) |
| *G10L 15/26* | (2006.01) |

(Continued)

(52) U.S. Cl.
CPC .......... *G06F 3/04842* (2013.01); *G06F 3/013* (2013.01); *G06F 3/017* (2013.01); *G06F 3/038* (2013.01); *G06F 3/048* (2013.01); *G06F 3/0488* (2013.01); *G06F 3/04883* (2013.01); *G06F 17/243* (2013.01); *G06F 3/0416* (2013.01); *G06F 3/167* (2013.01); *G06F 2203/0381* (2013.01); *G10L 15/22* (2013.01); *G10L 15/26* (2013.01)

(58) Field of Classification Search
CPC .... G06F 3/038; G06F 3/0416; G06F 3/04842; G06F 3/0488; G06F 3/167; G06F 17/243; G06F 2203/0381; G10L 15/22; G10L 15/26
See application file for complete search history.

(56) References Cited

U.S. PATENT DOCUMENTS

| | | | | |
|---|---|---|---|---|
| 5,600,765 A | * | 2/1997 | Ando | ................... G06F 3/038 345/668 |
| 6,320,601 B1 | * | 11/2001 | Takasu | ................... G06F 17/24 715/764 |

(Continued)

FOREIGN PATENT DOCUMENTS

CN   102749990 A   10/2012

OTHER PUBLICATIONS

Definition of "deictic" from the Oford Dictionaries, retrieved on Jun. 25, 2018, from https://en.oxforddictionaries.com/definition/deictic.*

*Primary Examiner* — Eric J. Bycer
(74) *Attorney, Agent, or Firm* — Ference & Associates LLC (57) ABSTRACT

An embodiment provides a method, including: detecting, at an electronic device, a command input using a first modality; detecting, at the electronic device, a selecting input using a different modality; combining, using a processor, the command input and the selecting input into an application formatted command; and providing the application formatted command to an application running on the electronic device for execution. Other aspects are described and claimed.

20 Claims, 5 Drawing Sheets

(51) Int. Cl.
    *G06F 3/041*    (2006.01)
    *G10L 15/22*    (2006.01)

(56) References Cited

U.S. PATENT DOCUMENTS

| | | | |
|---|---|---|---|
| 6,996,800 B2* | 2/2006 | Lucassen | G06F 8/38 717/104 |
| 2005/0138219 A1 | 6/2005 | Bou-Ghannam et al. | |
| 2007/0124507 A1* | 5/2007 | Gurram | G06F 3/0481 710/1 |
| 2008/0162143 A1* | 7/2008 | Agapi | G06F 3/167 704/275 |
| 2008/0211766 A1* | 9/2008 | Westerman | G06F 3/038 345/156 |
| 2011/0313768 A1 | 12/2011 | Klein et al. | |
| 2012/0016678 A1* | 1/2012 | Gruber | G06F 17/3087 704/275 |
| 2012/0075184 A1 | 3/2012 | Madhvanath | |
| 2012/0105257 A1 | 5/2012 | Murillo et al. | |
| 2012/0257035 A1 | 10/2012 | Larsen | |
| 2012/0260176 A1* | 10/2012 | Sehrer | G06F 17/24 715/727 |
| 2014/0350942 A1* | 11/2014 | Kady | B60R 16/0231 704/275 |

\* cited by examiner

MULTI-MODAL FUSION ENGINE

BACKGROUND

Certain electronic devices, e.g., desktop and laptop computers, offer a rich input environment such as a physical mouse and keyboard, as well as other input modalities, e.g., a camera for gaze tracking/eye inputs, microphones for voice inputs, etc. Other electronic devices come in different forms, e.g., more mobile forms such as a tablet computing device or a smart phone. Some of these mobile forms often lack one or more input devices, e.g., a physical keyboard and a mouse.

A user might desire to use more compact and mobile electronic devices, e.g., a tablet computer or a smart phone, with an application, e.g., a spreadsheet application, that was designed with a different form of electronic device in mind. Thus, a user might find that the application in question has enhanced use capabilities on a more traditional form factor, e.g., laptop or desktop computer, as compared to a mobile device version of the application. Even in cases where the application is fully realized in a mobile form, a user might still find difficulty in interacting with the application on certain mobile devices, e.g., a tablet computer, a smart phone, or the like. This results from the differences in the electronic devices, i.e., the different input environments offered by each.

BRIEF SUMMARY

In summary, one aspect provides a method, comprising: detecting, at an electronic device, a command input using a first modality; detecting, at the electronic device, a selecting input using a different modality; combining, using a processor, the command input and the selecting input into an application formatted command; and providing the application formatted command to an application running on the electronic device for execution.

Another aspect provides an electronic device, comprising: a first input device that detects user input using a first modality; a second input device that detects user input using a different modality; a processor; and a memory storing instructions executable by the processor to: detect a command input using a first modality; detect a selecting input using a different modality; combine the command input and the selecting input into an application formatted command; and provide the application formatted command to an application running on the electronic device for execution.

A further aspect provides a program product, comprising: a storage device storing processor executable code, comprising: code that detects a command input using a first modality; code that detects a selecting input using a different modality; code that combines the command input and the selecting input into an application formatted command; and code that provides the application formatted command to an application running on the electronic device for execution.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment allows users to interact with an electronic device by combining modalities of input in a more natural way. For example, an embodiment permits the use of both natural spoken language and other modalities such as touch, gesture or eye tracking input, to be combined by a user for operating an electronic device application. An embodiment thus solves the problem of reference resolution, i.e., robustly understanding which entities the user refers to when using expressions such as "this," "that," and the like in sentences such as "email this table to John," "translate this paragraph into Spanish," etc.

Current commercially available multi-modal solutions do not allow tight integration of speech and other modalities, but rather allow the user to pick one modality or the other to perform their task. This prevents the user from speaking natural sentences that refer to other events such as touch, gesture or gaze that the user may wish to utilize for providing inputs. As may be appreciated, embodiments permit full use of electronic devices having limited input modalities, e.g., lacking a physical keyboard and mouse, such as mobile phones, tablet computing devices, and like form factors.

Thus, users may employ many applications, e.g., spreadsheet applications, word processing applications, and the like, to full effect.

An embodiment uses a set of uni-modal input processors, such as a voice recognizer, a touch screen event processor, a gaze tracker, etc., to collect various inputs that the user might provide separately, although related to one another, as further described herein. A unique event repository, referred to herein as a "library" or "database," stores incoming events with timestamps and the information necessary to later infer their meaning by association with other events, commands, etc. For example, timestamps may allow an embodiment to determine what was on the screen when the user touched a particular spot. A natural language understanding module extracts commands (e.g., "copy," "translate," "email," etc.) and referring expressions (e.g., "this table," "John," "this paragraph," etc.) from the user's spoken sentences. A reference resolution engine then matches extracted, referring expressions to one or more entities within the application, using application specific resolvers to produce application usable outputs.

This modular architecture offers a way of abstracting away the core processing necessary for multi-modal fusion from the application itself. In other words, an embodiment may be implemented as a generalized sub-system that can be easily reused across multiple applications with only a limited amount of coding required for each application.

Compared to other multi-modal solutions, the embodiments described herein allow for a much more natural interaction in many situations, particularly in applications that involve the manipulation of entities such as documents, contacts (e.g., from an address book or a social network), images, etc. In addition, such a modular architecture gives embodiments a significant flexibility, reducing difficulty and cost of development for new applications as compared to an application-specific approach to multi-modal fusion.

The illustrated example embodiments will be best understood by reference to the figures. The following description is intended only by way of example, and simply illustrates certain example embodiments.

Figure 1:
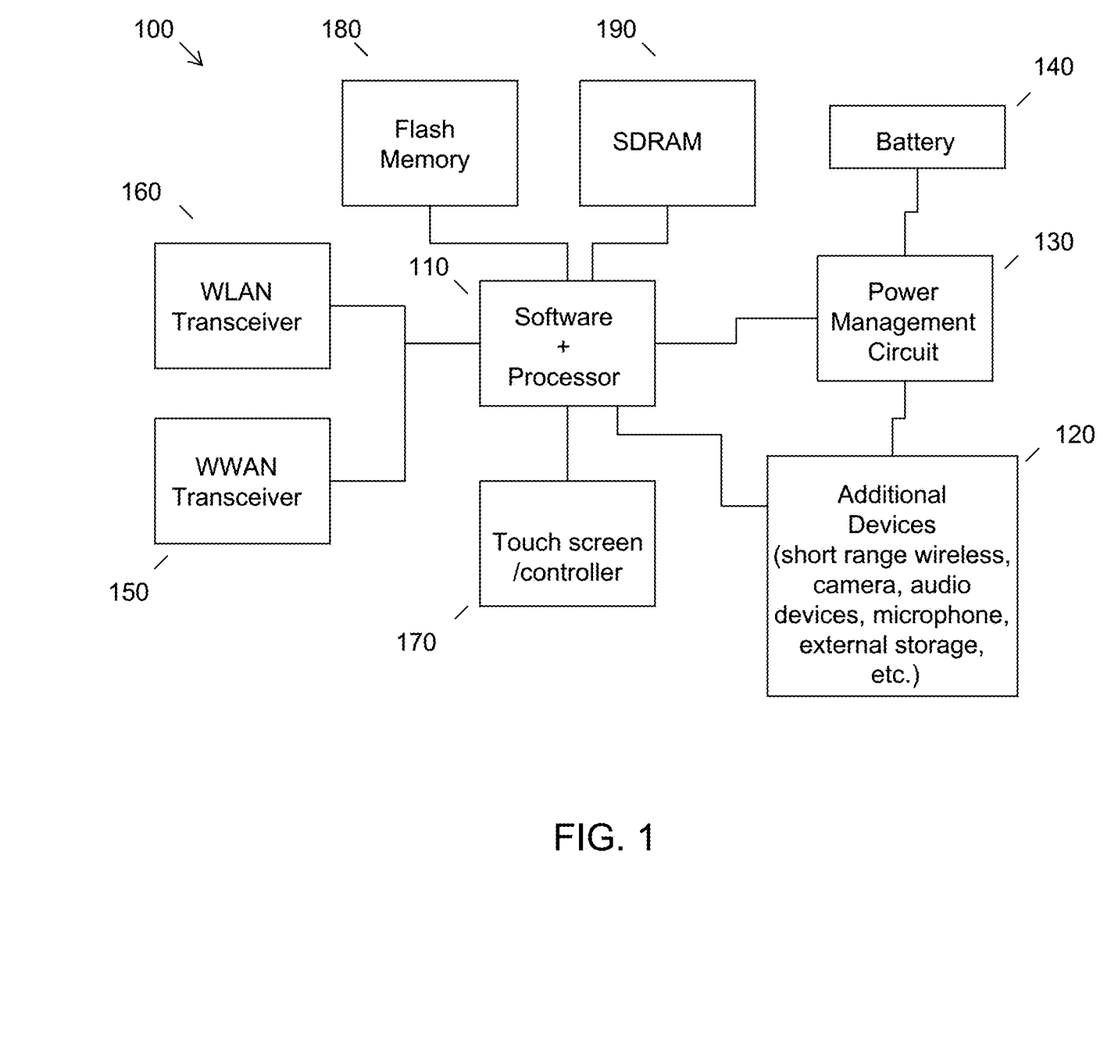
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera or an audio sensor such as a microphone. System 100 often includes a touch screen 170 for data input and display/rendering. System 100 also typically includes various memory devices, for example flash memory 180 and SDRAM 190.

Figure 2:
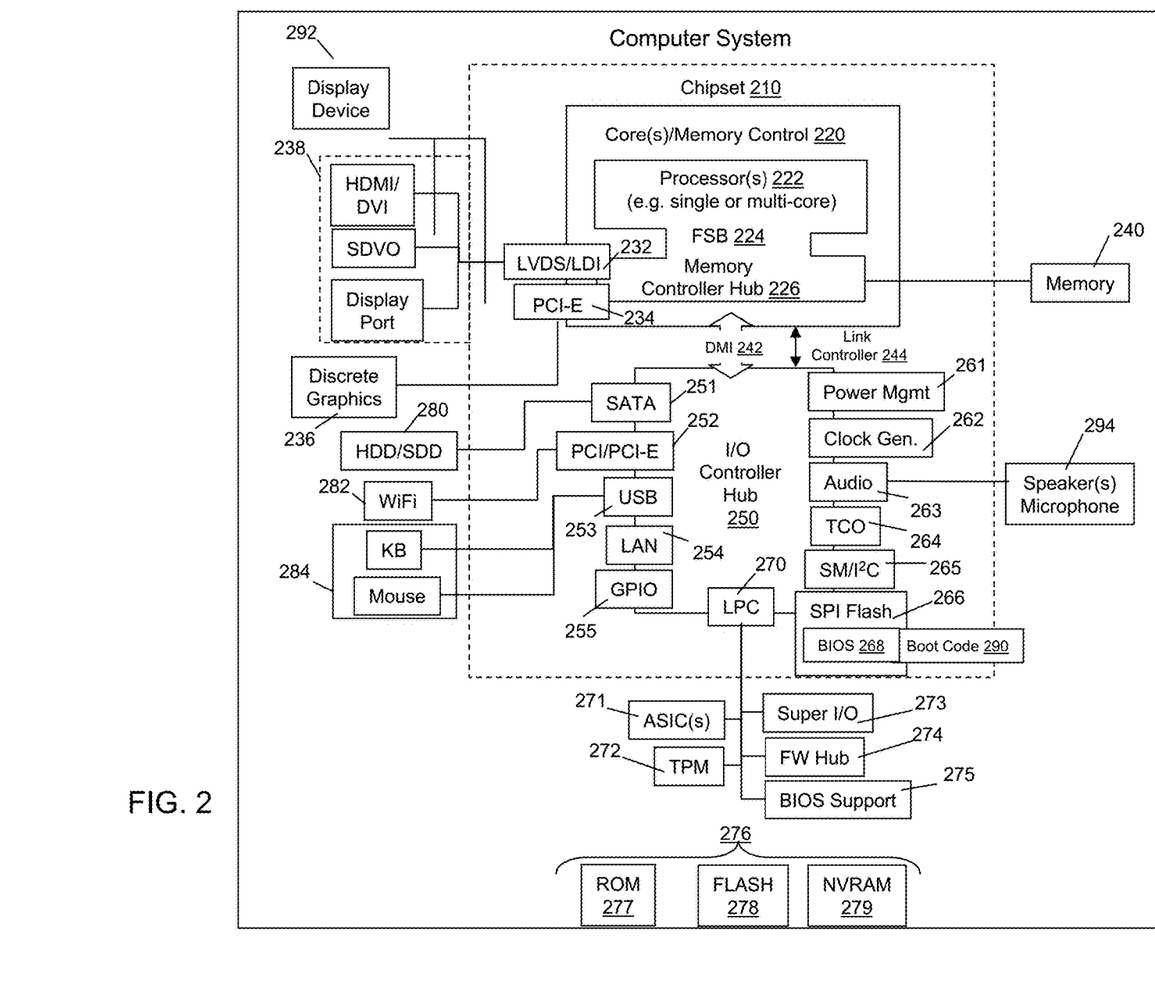
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers or a microphone 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in various embodiments. However, to highlight certain aspects by way of non-limiting example, certain embodiments will be described in connection with operating an electronic device such as a tablet or smart phone including circuitry such as outlined by way of example in FIG. 1.

It will be understood that such devices, e.g., a tablet computing device, primarily offer touch screens, microphones and cameras as primary input devices, with current devices relying primarily on the touch screen and microphone inputs for application control. In an embodiment, fusion of such modalities provides a more user friendly experience, particularly for certain applications that may warrant the user of other input modalities (e.g., physical mouse) not supported by such devices.

Figure 3:
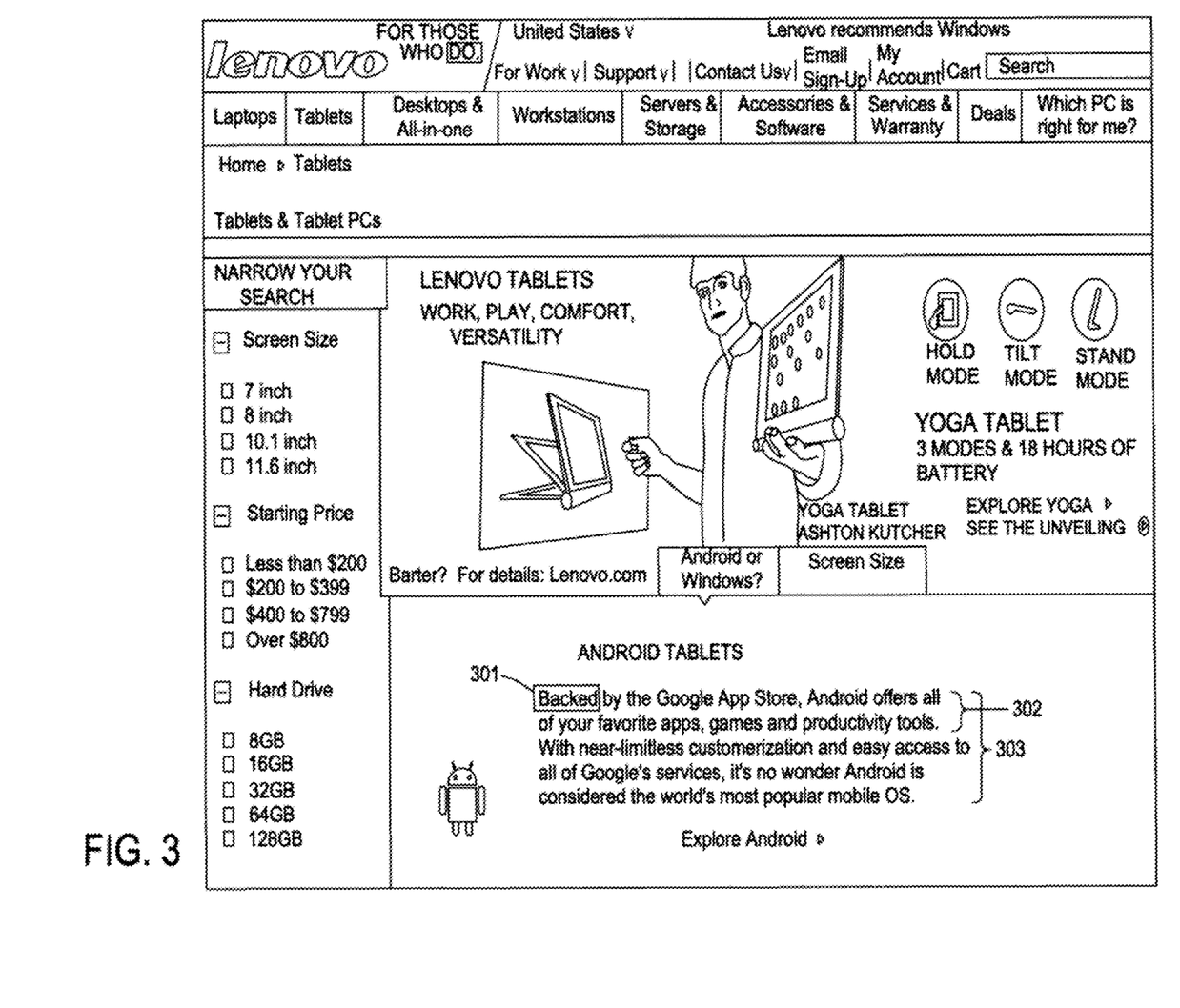
FIG. 3 illustrates an example of multi-modal fusion with an example web browser application.

By way of example, and referring to FIG. 3, consider a web browser that renders text and images of a web page on a display device such as touch screen 170 of FIG. 1. An embodiment allows a user to provide touch and voice inputs to operate various functions, such as text selection, copying, sharing, etc., in a streamlined fashion.

In the example of FIG. 3, a user might provide a touch input at a particular word, e.g., "Backed" at position 301 on a touch input display, e.g., of a tablet computing device. Conventionally, as this word is not hyperlinked, a touch input in this area 301 would have no effect (other than possibly slightly repositioning the rendered web page). However, an embodiment records this touch input event in a library, e.g., a touch input has occurred at a particular position (e.g., touch screen coordinates) associated with an element in the web page (in this example, the word "Backed"). As described herein, this event data may be stored as contextual data and associated with a time stamp, e.g., time "t1."

At another time, e.g., at time "t2," a user may provide voice input, e.g., to a microphone 120 of a tablet computing device 100, using natural language such as "copy that." In a conventional system, there would be no association between "that" and the word the user had previously touched, in this example "Backed" associated with touch position 301. However, because an embodiment keeps a predetermined amount of events (which may vary, as described further herein) in the library or event database to build a contextual data store, the voice input command of "copy" may be associated with the touch input at the location 301 of the word "Backed." Thus, an embodiment may execute a copy command, e.g., placing the word "Backed" on a clipboard for pasting into another location, e.g., a body of an email, text message, etc.

By way of extension of the above example, an embodiment may easily distinguish various commands using natural language processing and leverage multi-modal fusion to resolve any ambiguities. Thus, for example, had the input command been "copy that sentence," an embodiment may associate the touch input at 301, i.e., associated with the word "Backed," to be further associated with the sentence "Backed by the GOOGLE® App Store . . . " 302. It is thus possible for a user to copy the entire sentence by the simple fusion of the touch event 301 with the natural language processing of the voice input command, aided by an embodiment's access to the contextual library and associations.

It may further be appreciated that an embodiment may likewise distinguish the command "copy that paragraph" from "copy that" and "copy that sentence" to permit a user to copy an entire paragraph, again with the simple touch of the same point on the touch input display, i.e., area 301 in this example. Much the same can be said for other elements in the web page, e.g., a picture, a table, etc. Therefore, a user is assisted in various actions, e.g., selection and copy actions, using a fusion of touch and voice inputs, as if the user were equipped with an electronic device having a physical mouse, a keyboard, etc.

An embodiment has the ability to make inputs to various applications in an enhanced manner as if the electronic device in question had access to more conventional input devices. It will be appreciated that this ability may be facilitated by application developers building forms that indicate which types of inputs the applications require. Given this information, a fusion engine provided by an embodiment may collect the contextual information necessary to provide fusion of modal inputs that map to or are associated with that particular application's required inputs. A spreadsheet application will be described by way of further non-limiting example.

Figure 4:
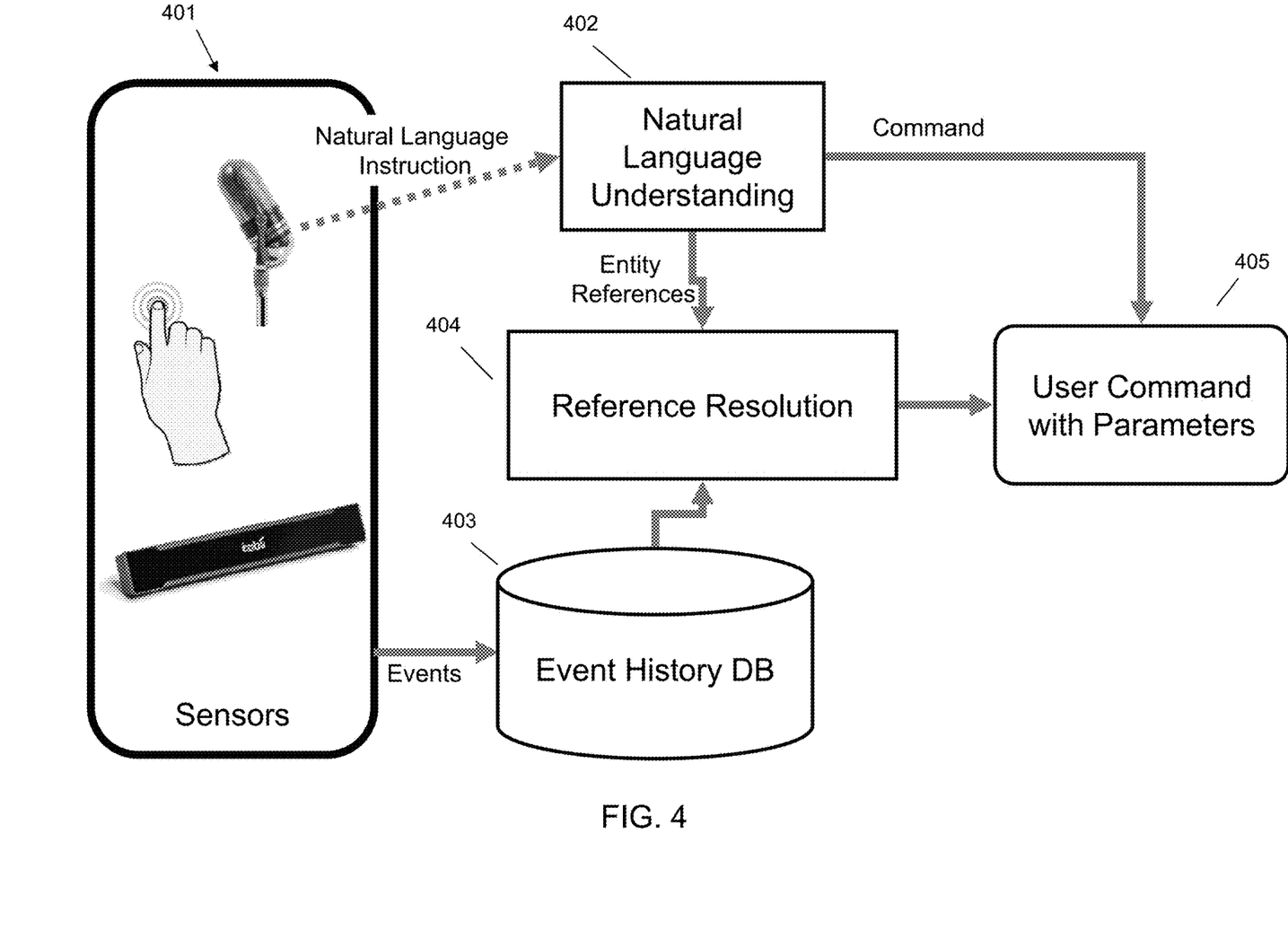
FIG. 4 illustrates an example overview of a system for multi-modal fusion.

First, an embodiment is generally overviewed in this regard with reference to FIG. 4. In this example of FIG. 4 the general framework is illustrated. As has been described, a device will have sensors or input devices 401, such as a microphone or touch input capability as illustrated in FIG. 4. Using these devices or sensors 401, a user may interact with the device, e.g., providing touch events and voice inputs.

An embodiment receives voice inputs, e.g., commands issued in natural language format, using a microphone 401 and submits these to a speech recognition system and (in this example) a natural language understanding or processing module 402. This permits an embodiment to accurately understand the literal input (using speech recognition) and resolve the natural language inputs, i.e., translating the literally interpreted by the speech recognition system into usable command parameters, e.g., for an application running on the electronic device.

Likewise, an embodiment logs events, e.g., touch events provided to a touch screen display, eye focus events provided to a camera and gaze tracking subsystem, etc., and stores these in an event history database 403. As may be appreciated, the events history database 403 may store many or a few events (e.g., last "x" events, where "x" is customizable or modified, e.g., based on user preference, system capabilities such as amount of memory, user preferences, etc.).

The output of the natural language understanding or processing module 402 may be a command, as illustrated in FIG. 4. The events history database may be accessed or consulted by a resolver module 404 to provide for reference resolution. By way of example, a natural language processing of the voice input "copy that paragraph" might faithfully yield a "copy" command resolution. However, access to the events history database 403 permits an embodiment to understand contextually what "that paragraph" is in this case, i.e., the paragraph of the web page most recently touched by the user, borrowing from the example illustrated in FIG. 3, perhaps the paragraph associated with touch location 301.

Accordingly, it may be appreciated that an embodiment may output a user command that is supplemented with parameter(s) at 405, e.g., an application-specific reference to "that paragraph." This permits the user to control an application, e.g., a copy function of an application running on an electronic device, using a contextual understanding or resolution of a potentially ambiguous voice input command. It will further be appreciated that such resolution effectively extends the capabilities of the limited number of sensors or input devices 401 offered on many smaller form factor devices, freeing a user to easily interface with even complex applications.

Figure 5:
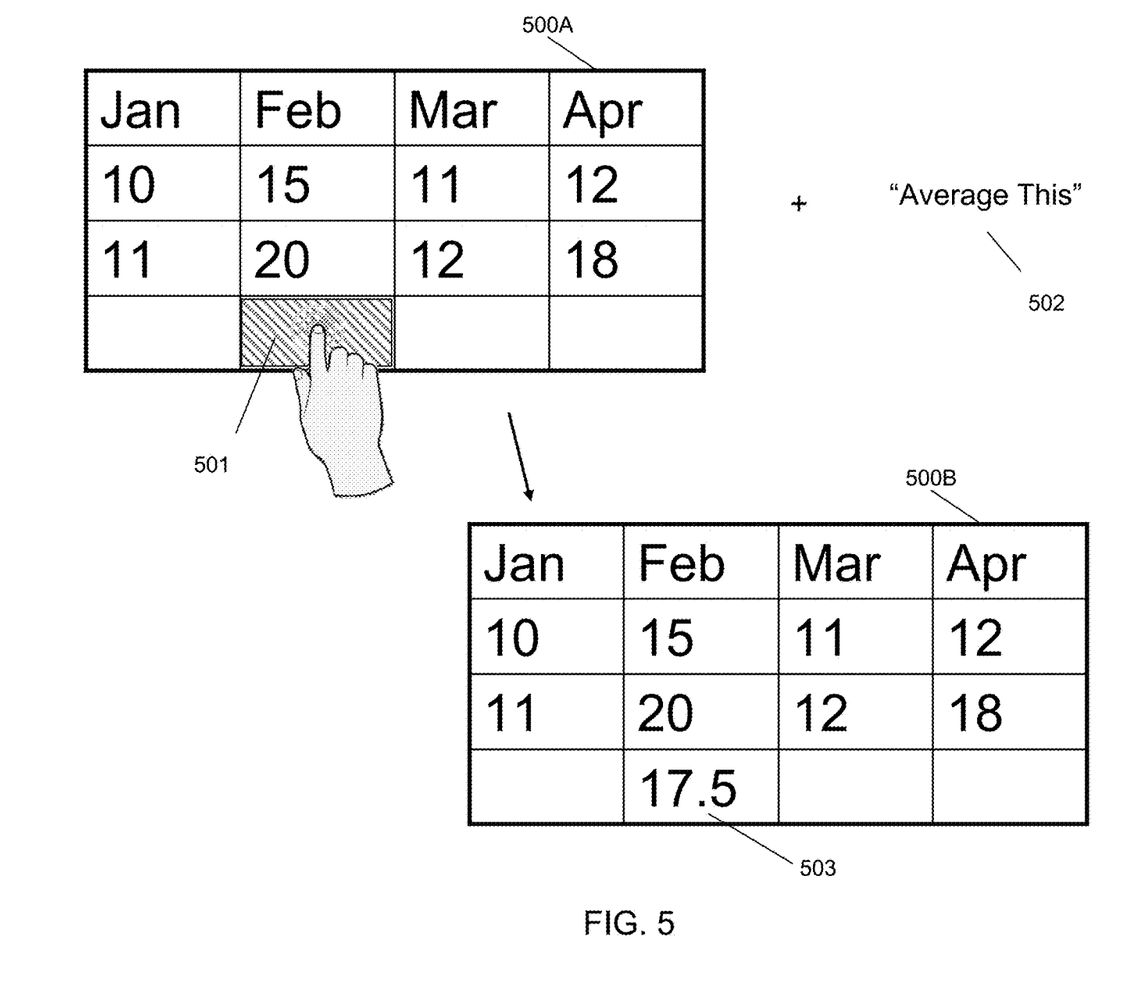
FIG. 5 illustrates an example of multi-modal fusion with an example spreadsheet application.

Turning to FIG. 5, an example of such application control is illustrated with reference to a spreadsheet application. It should be noted that this is a non-limiting example and that the principles described generally herein may be extended to many other types of applications, input events, modalities, etc.

In the example of FIG. 5, a spreadsheet application is used to illustrate an example of multi-modal fusion according to an embodiment. In FIG. 5 a spreadsheet 500A includes various columns with header cell values such as "Jan," "Feb," "Mar," and "Apr." Likewise, the spreadsheet 500A illustrated includes values in rows of each column, as per the spreadsheet application's layout.

If a user provides a touch input 501 to a given cell, this event will be recorded and stored, e.g., in event history database 403, for future reference in terms of contextual resolution, as further described herein. If a user additionally provides another input using a different modality, e.g., a voice input 502 such as "Average This," an embodiment likewise receives this input, e.g., via a sensor 401 such as a microphone, processed using a natural language processor or understanding module 402. It should be noted that the inputs (voice and touch in this example) may be received in any order.

In a conventional setting, the voice input "Average This" may be processed by a natural language processor, e.g., 402, and understood as an "average" command, e.g., for the running spreadsheet application. However, the ambiguity "This" would not be resolvable. However, in an embodiment, multi-modal fusion allows for a reference resolution module 404 to determine, e.g., via consulting event history database 403, that "This" in the voice input command refers to touch input 501, i.e., an area of the touch input display logically associated with column "Feb" of the spreadsheet application. Thus, an embodiment may provide formatted application data, e.g., "average" command for column "Feb" such that the spreadsheet application may process the same and produce the output "17.5" in a predetermined area, e.g., 503.

Accordingly, a user may provide a touch input 501 and voice input 502 to produce an averaging of a column of the spreadsheet, e.g., updating the spreadsheet to form 500B, i.e., including the averaged value "17.5" in a predetermined cell 503 under the "Feb" column. In this way, multi-modal fusion permits a user to easily use an application such as a spreadsheet application that conventionally would require use of more sophisticated input devices, e.g., a mouse and/or a keyboard, or otherwise cumbersome inputs provided to the touch screen alone.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages or machine code. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
detecting, at an electronic device, using a first uni-modal input processor, and at a first time, a command input using a first modality, and associating a command input time stamp with the command input, wherein the command input comprises a command and at least one deictic expression;
detecting, at the electronic device and within an application, using a second uni-modal input processor, and at a second time different than the first time, a selecting input associated with an entity within the application and using a different modality, wherein the detecting comprises identifying a location on the electronic device corresponding to a location of the selecting input;
storing the selecting input as contextual data with an associated selecting input time stamp;
combining, by receiving the command input from the first uni-modal input processor and the selecting input from the second uni-modal input processor, the command input and the selecting input into an application command having at least one application parameter referencing the entity of the selecting input;
the combining comprising associating the command input with the selecting input based upon the contextual data and resolving the at least one deictic expression into the at least one application parameter by matching the at least one deictic expression to one or more entities contained within the application using a resolver module that utilizes the contextual data and the identified location of the selecting input, associated selecting input time stamp, and the command input time stamp to identify the entity of the selecting input; and
providing the application command to an application running on the electronic device for execution.

2. The method of claim 1, wherein the combining comprises associating one or more of the command input and the selecting input with a specific format.

3. The method of claim 2, wherein the associating comprises transforming one or more of the command input and the selecting input into a different format.

4. The method of claim 3, wherein the transforming comprises applying natural language processing to the command input.

5. The method of claim 3, wherein the transforming comprises associating touch input display coordinates with an object rendered within the application.

6. The method of claim 1, wherein the combining comprises referencing a library of stored inputs.

7. The method of claim 6, wherein the referencing comprises accessing the library of stored inputs responsive to one or more of the command input and the selecting input.

8. The method of claim 1, wherein the command input comprises natural language speech input.

9. The method of claim 1, wherein the selecting input is selected from the group consisting of touch input, gesture input, and eye tracking input.

10. An electronic device, comprising:
a first input device that detects user input using a first modality;
a second input device that detects user input using a different modality;
a processor; and
a memory storing instructions executable by the processor to:
detect, using a first uni-modal input processor, and at a first time, a command input using a first modality and associating a command input time stamp with the command input, wherein the command input comprises a command and at least one deictic expression;
detect, within an application, using a second uni-modal input processor, and at a second time different than the first time, a selecting input associated with an entity within the application and using a different modality, wherein the detecting comprises identifying a location on the electronic device corresponding to a location of the selecting input;
store the selecting input as contextual data with an associated selecting input time stamp;
combine, by receiving the command input from the first uni-modal input processor and the selecting input from the second uni-modal input processor, the command input and the selecting input into an application command having at least one application parameter referencing the entity of the selecting input;
the combining comprising associating the command input with the selecting input based upon the contextual data and resolving the at least one deictic expression into the at least one application parameter by matching the at least one deictic expression to one or more entities contained within the application using a resolver module that utilizes the contextual data and the identified location of the selecting input, associated selecting input time stamp, and the command input time stamp to identify the entity of the selecting input; and
provide the application command to an application running on the electronic device for execution.

11. The electronic device of claim 10, wherein to combine comprises associating one or more of the command input and the selecting input with a specific format.

12. The electronic device of claim 11, wherein the associating comprises transforming one or more of the command input and the selecting input into a different format.

13. The electronic device of claim 12, wherein the transforming comprises applying natural language processing to the command input.

14. The electronic device of claim 12, wherein the transforming comprises associating touch input display coordinates with an object rendered within the application.

15. The electronic device of claim 10, wherein to combine comprises referencing a library of stored inputs.

16. The electronic device of claim 15, wherein the referencing comprises accessing the library of stored inputs responsive to one or more of the command input and the selecting input.

17. The electronic device of claim 10, wherein the command input comprises natural language speech input.

18. The electronic device of claim 10, wherein the selecting input is selected from the group consisting of touch input, gesture input, and eye tracking input.

19. The electronic device of claim 10 wherein the first input device and the second input device are not the same device.

20. A program product, comprising:
a storage device storing processor executable code, comprising:
code that detects, using a first uni-modal input processor, and at a first time, a command input using a first modality and associating a command input time stamp with the command input, wherein the command input comprises a command and at least one deictic expression;

code that detects, within an application, using a second uni-modal input processor, and at a second time different than the first time, a selecting input associated with an entity within the application and using a different modality, wherein the detecting comprises identifying a location on the electronic device corresponding to a location of the selecting input;

code that stores the selecting input as contextual data with an associated selecting input time stamp;

code that combines, by receiving the command input from the first uni-modal input processor and the selecting input from the second uni-modal input processor, the command input and the selecting input into an application command having at least one application parameter referencing the entity of the selecting input;

the combining comprising associating the command input with the selecting input based upon the contextual data and resolving the at least one deictic expression into the at least one application parameter by matching the at least one deictic expression to one or more entities contained within the application using a resolver module that utilizes the contextual data and the identified location of the selecting input, associated selecting input time stamp, and the command input time stamp to identify the entity of the selecting input; and code that provides the application command to an application running on the electronic device for execution.

* * * * *